United States Patent
Vasquez et al.

(10) Patent No.: US 8,072,443 B2
(45) Date of Patent: Dec. 6, 2011

(54) TECHNIQUES TO SWITCH BETWEEN VIDEO DISPLAY MODES

(75) Inventors: Maximino Vasquez, Fremont, CA (US); Todd M. Witter, Orangevale, CA (US); Sylvia J. Downing, El Dorado Hills, CA (US); Trudy Hoekstra, Latrobe, CA (US); Kristine M. Karnos, San Jose, CA (US); Zudan Shi, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 1453 days.

(21) Appl. No.: 11/171,590

(22) Filed: Jun. 29, 2005

(65) Prior Publication Data

US 2007/0002168 A1  Jan. 4, 2007

(51) Int. Cl.
  *G06F 3/038* (2006.01)
  *H04N 7/01* (2006.01)
(52) U.S. Cl. ......... 345/204; 345/211; 345/213; 348/446
(58) Field of Classification Search ................ 345/210, 345/211, 213, 201, 212; 348/446–448, 521–548
See application file for complete search history.

(56) References Cited

U.S. PATENT DOCUMENTS

| | | | | | |
|---|---|---|---|---|---|
| 4,829,370 | A | * | 5/1989 | Mayne et al. | 358/537 |
| 5,486,868 | A | * | 1/1996 | Shyu et al. | 348/524 |
| 5,530,484 | A | * | 6/1996 | Bhatt et al. | 348/556 |
| 6,633,344 | B1 | | 10/2003 | Worrell et al. | |
| 7,388,579 | B2 | | 6/2008 | O'Gorman et al. | |
| 2001/0028409 | A1 | * | 10/2001 | Watanabe et al. | 348/554 |
| 2004/0239803 | A1 | * | 12/2004 | Selby et al. | 348/459 |
| 2005/0030422 | A1 | | 2/2005 | Leone et al. | |
| 2005/0103977 | A1 | * | 5/2005 | Krymski | 250/208.1 |
| 2008/0030615 | A1 | | 2/2008 | Vasquez et al. | |

FOREIGN PATENT DOCUMENTS

| | | |
|---|---|---|
| CN | 1137207 | 12/1996 |
| CN | 1140950 A | 1/1997 |
| CN | 1247362 A | 3/2000 |
| CN | 1551098 | 12/2004 |
| JP | 09009168 A2 | 1/1997 |
| WO | 2007/002949 A1 | 1/2007 |
| WO | 2007/002950 A1 | 1/2007 |

* cited by examiner

*Primary Examiner* — Amare Mengistu
*Assistant Examiner* — Hong Zhou
(74) *Attorney, Agent, or Firm* — Kacvinsky Daisak PLLC

(57) ABSTRACT

A system, apparatus, method and article to switch between video display modes are described. The apparatus may include a graphics device to switch between a progressive mode and an interlaced mode to display media information using a single pixel clock frequency for both modes. Other embodiments are described and claimed.

12 Claims, 5 Drawing Sheets

TECHNIQUES TO SWITCH BETWEEN VIDEO DISPLAY MODES

BACKGROUND

A mobile device such as a notebook computer may be capable of displaying media information, such as movie content, moving pictures content, television content, business application content, and so forth. Since a mobile device typically relies upon battery power, the mobile device may have several different levels of operating modes that consume varying levels of power. Reducing power consumption while displaying media information, however, may cause disruptions in the displayed media information. Consequently, there may be a need for improved display and power reducing techniques.

DETAILED DESCRIPTION

Figure 1:
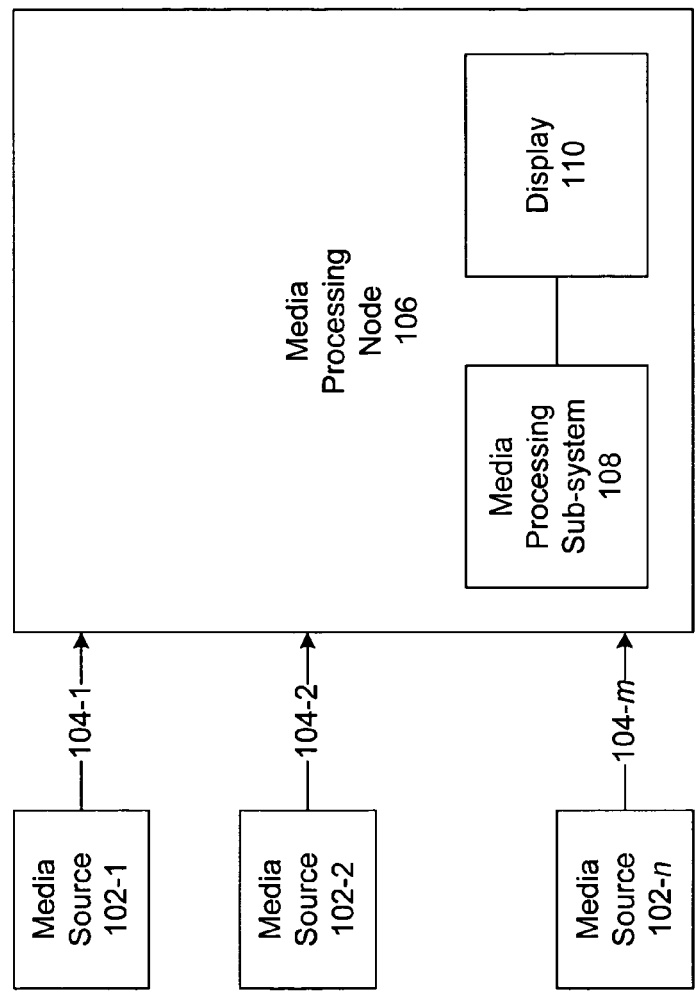
FIG. 1 illustrates one embodiment of a system.

FIG. 1 illustrates one embodiment of a system. FIG. 1 illustrates a block diagram of a system 100. In one embodiment, for example, system 100 may comprise a media processing system having multiple nodes. A node may comprise any physical or logical entity for processing and/or communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise a processing system, a computer system, a computer sub-system, a computer, a workstation, a terminal, a server, a personal computer (PC), a laptop computer, an ultra-laptop computer, a portable computer, a handheld computer, a personal digital assistant (PDA), a mobile telephone, a combination PDA/mobile telephone, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, the nodes of system 100 may communicate, manage, or process information in accordance with one or more protocols. A protocol may comprise a set of predefined rules or instructions for managing communication among nodes. A protocol may be defined by one or more standards as promulgated by a standards organization, such as the Internet Engineering Task Force (IETF), International Telecommunications Union (ITU), the International Organization for Standardization (ISO), the International Electrotechnical Commission (IEC), the Institute of Electrical and Electronics Engineers (IEEE), and so forth. The embodiments are not limited in this context.

In various embodiments, the nodes of system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a node to process the media information in a predetermined manner, and so forth. The embodiments are not limited in this context.

In various embodiments, system 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media. An example of wireless communication media may include portions of a wireless spectrum, such as the RF spectrum in general, and the ultra-high frequency (UHF) spectrum in particular. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In various embodiments, system 100 may comprise a media processing system having one or more media source nodes 102-1-*n*. Media source nodes 102-1-*n* may comprise any media source capable of sourcing or delivering media information and/or control information to media processing node 106. More particularly, media source nodes 102-1-*n* may comprise any media source capable of sourcing or delivering digital audio and/or video (AV) signals to media processing node 106. Examples of media source nodes 102-1-*n* may include any hardware or software element capable of storing and/or delivering media information, such as a Digital Versatile Disk (DVD) device, a Video Home System (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, and so forth. Other examples of media source nodes 102-1-*n* may include media distribution systems to provide broadcast or streaming analog or digital AV signals to media processing node 106. Examples of media distribution systems may include, for example, Over The Air (OTA) broadcast systems, terrestrial cable systems (CATV), satellite broadcast systems, and so forth. It is worthy to note that media source nodes 102-1-*n* may be internal or external to media processing node 106, depending upon a given implementation. The embodiments are not limited in this context.

In various embodiments, the incoming video signals received from media source nodes 102-1-*n* may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context.

In various embodiments, media processing system 100 may comprise a media processing node 106 to connect to media source nodes 102-1-*n* over one or more communications media 104-1-*m*. Media processing node 106 may comprise any node as previously described that is arranged to process media information received from media source nodes 102-1-*n*. In one embodiment, for example, media processing node 106 may comprise a mobile device. Examples of mobile devices may include a notebook computer, a laptop computer, an ultra-laptop computer, a portable computer, a handheld computer, a PDA, a cellular telephone, a combination PDA/cellular telephone, and so forth. In one embodiment, for example, media processing node 106 may comprise a notebook computer, although the embodiments are not limited in this context.

In various embodiments, media processing node 106 may include a media processing sub-system 108. Media processing sub-system 108 may comprise a processor, memory and application hardware and/or software arranged to process media information received from media source nodes 102-1-*n*. For example, media processing sub-system 108 may filter the media information, convert the media information between different visual resolution formats and display resolution formats, control the timing used to display the media information, switch scanning techniques used to display the media information, and perform other media processing operations as described in more detail below. Media processing sub-system 108 may output the processed media information to a display 110. The embodiments are not limited in this context.

In various embodiments, media processing node 106 may include a display 110. Display 110 may be any display capable of displaying media information received from media source nodes 102-1-*n*. Display 110 may display the media information at a given format resolution. For example, display 110 may display the media information on a display having a VGA format resolution, XGA format resolution, SXGA format resolution, UXGA format resolution, and so forth. The type of displays and format resolutions may vary in accordance with a given set of design or performance constraints, and the embodiments are not limited in this context.

In general operation, media processing node 106 may receive media information from one or more of media source nodes 102-1-*n*. In one embodiment, for example, media processing node 106 may receive media information from a media source node 102-1 implemented as a DVD player integrated with media processing node 106. Media processing sub-system 108 may retrieve the media information from the DVD player, convert the media information from the visual resolution format to the display resolution format of display 110, and reproduce the media information using display 110.

In one embodiment, for example, media processing sub-system 108 may display the media information using display 110. Media processing sub-system 108 may draw an image or picture on display 110 by sweeping an electrical signal horizontally across display 110 one line at a time. The amplitude of this signal versus time represents the instantaneous brightness at a given physical point on display 110. At the end of each line, there is a portion of the waveform referred to as a horizontal blanking interval. The horizontal blanking interval tells a scanning circuit in display 110 to retrace to the left edge of display 110 and then start scanning the next line. Starting at the top of display 110, all of the lines on display 110 are scanned in this way. One complete set of lines makes a picture or image. This is referred to as a frame. Once the first complete picture is scanned, there is another portion of the waveform referred to as the vertical blanking interval that causes the scanning circuit to retrace to the top of display 110 and start scanning the next frame or picture. When reproducing moving pictures such as a video, this sequence is repeated at a fast enough rate so that the displayed images are perceived to have continuous motion.

In one embodiment, for example, media processing sub-system 108 may display the media information in multiple display modes or scan modes. Examples of display modes may include interlaced and non-interlaced scan modes. Interlaced and non-interlaced scan modes use two different types of scanning techniques. The scanning techniques differ in how the media information is reproduced on display 110. Television signals and compatible displays are typically interlaced, and computer signals and compatible displays are typically non-interlaced. These two formats are typically incompatible with each other. Therefore media information in one format would need to be converted to the other format before any common processing could be done.

Interlaced scanning is where a frame representing a picture is divided into two separate fields. One field may include odd lines for a picture, while the other field may include even lines for a picture. The two fields make up a frame. An interlaced picture is drawn on the screen in two passes, by first scanning the horizontal lines of the first field, retracing to the top of the screen, and then scanning (or interlacing) the horizontal lines for the second field in-between the first set. For example, if a picture comprises 525 lines, Field 1 may comprise lines 1 through 262½ of the picture, and Field 2 may comprise lines 262½ through 525 of the picture. Interlacing Field 1 and Field 2 at 60 fields per second achieves an effective 30 frame per second frame rate since the phosphors used in display 110 used to render Field 1 may remain active while Field 2 is being rendered.

Non-interlaced scanning may refer to reproducing a picture on display 110 by scanning all of the horizontal lines of the picture in one pass from the top to the bottom. Non-interlaced scanning may sometimes be referred to as "progressive scanning." Unlike interlaced scanning techniques, progressive scanning uses complete frames including both odd and even lines. Each scan displays an entire frame. Thus in progressive mode a frame rate of 60 frames per second causes 60 frames to be reproduced on display 110, while in interlaced mode a field rate of 60 fields per second causes only 30 frames to be reproduced on display 110. As a result, the progressive mode tends to deliver higher quality than the interlaced mode. Since the interlaced mode refreshes display 110 at half the rate of the progressive mode, however, the interlaced mode may use less power than the progressive mode.

In one embodiment, for example, media processing node 106 may be implemented in the form of a mobile device such as a notebook computer. Mobile devices may use different power sources, one of which may comprise a direct current (DC) battery. As a result, media processing node 106 may be arranged to operate at various levels of power in an attempt to conserve battery power. One way to reduce power for media processing node 106 is to display media information on display 110 using an interlaced mode rather than a progressive mode. Switching between display modes to reduce power, however, may cause disruptions or artifacts in display 110, thereby reducing the viewing experience of a user.

Various embodiments may address these and other problems. In one embodiment, for example, media processing node 106 may use media processing sub-system 108 to convert between an interlaced mode and a progressive mode to conserve power while reducing disruptions or artifacts in display 110. More particularly, media processing sub-system 108 may be implemented using a graphics device arranged to switch between a progressive mode and an interlaced mode to display media information using a single pixel clock frequency. Further, the graphics device may also use one set of display timing register values for both modes, or alternatively, different display timing register values for each mode, depending upon a desired implementation. Other embodiments are described and claimed. System 100 in general, and media processing sub-system 108 in particular, may be described in more detail with reference to FIG. 2.

Figure 2:
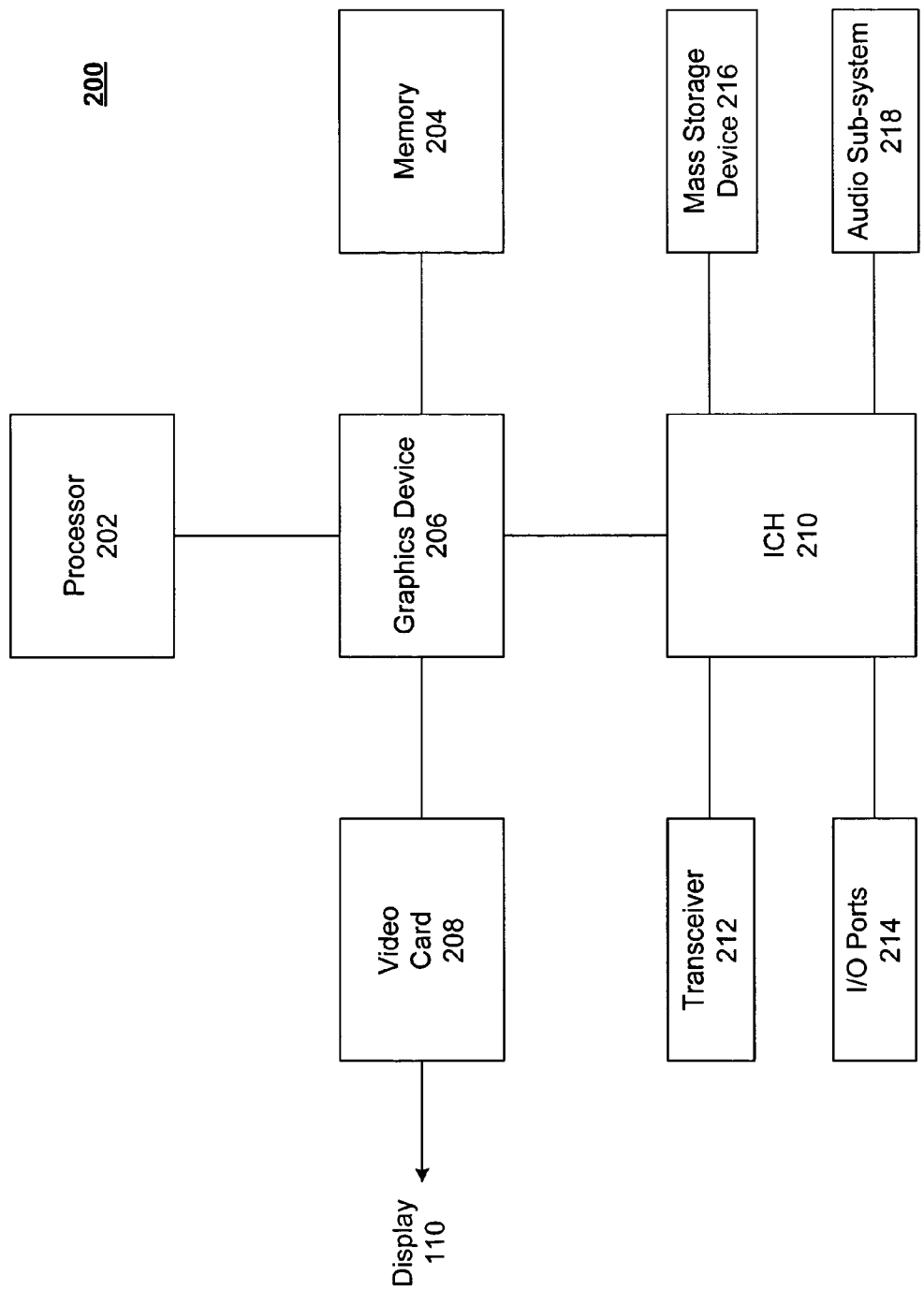
FIG. 2 illustrates one embodiment of a node.

FIG. 2 illustrates one embodiment of a node 200. FIG. 2 illustrates a block diagram of a media processing node 200 suitable for use with media processing system 100. Media processing node 200 may be representative of, for example, media processing node 106 as described with reference to FIG. 1. The embodiments are not limited, however, to the example given in FIG. 2.

As shown in FIG. 2, media processing node 106 may comprise multiple elements. One or more elements may be implemented using one or more circuits, components, registers, processors, software subroutines, modules, or any combination thereof, as desired for a given set of design or performance constraints. Although FIG. 2 shows a limited number of elements in a certain topology by way of example, it can be appreciated that more or less elements in any suitable topology may be used in media processing node 200 as desired for a given implementation. The embodiments are not limited in this context.

In various embodiments, media processing node 200 may include a processor 202. Processor 202 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. When implemented as a mobile device, for example, processor 202 may comprise part of an Intel Centrino™ mobile processing architecture, such as a Pentium® M processor and accompanying chipset. The embodiments, however, are not limited in this context.

In one embodiment, media processing node 200 may include a memory 204 to couple to processor 202. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 may be included on the same integrated circuit as processor 202, or alternatively some portion or all of memory 204 may be disposed on an integrated circuit or other medium, for example a hard disk drive, that is external to the integrated circuit of processor 202. In one embodiment, for example, memory 204 may comprise one or more second generation double-data rate (DDR) DRAM (DDR2) memory devices. The embodiments are not limited in this context.

In various embodiments, media processing node 200 may include media processing sub-system 108. In one embodiment, for example, media processing sub-system 108 may comprise a graphics device 206 to couple to memory 204. In other embodiments, media processing sub-system 108 may also comprise other elements of media processing node 106, such as processor 202, video card 208 and input/output (I/O) controller hub (ICH) 210, an integrated media source node 102-1-n, and so forth, depending upon a given implementation. The embodiments are not limited in this context.

In various embodiments, graphics device 206 may be implemented in a number of different ways. For example, graphics device 206 may be implemented using an integrated graphics and memory device, such as a graphics and memory controller hub (GMCH) 206. In another example, graphics device 206 may be implemented using a single integrated graphics device using memory 204 or other memory. In yet another example, graphics device 206 may be implemented as part of a separate board or chipset, such as part of video card 208. The embodiments are not limited in this context.

In various embodiments, graphics device 206 may perform media processing operations for media processing node 200. In one embodiment, for example, graphics device 206 may be implemented using a chipset designed to accompany processor 202. For example, if processor 202 is implemented using a Pentium M processor, graphics device 206 may be implemented as a GMCH comprising part of an Intel 915GM Express Chipset, for example. The 915GM Express Chipset may support a 533 Megahertz (MHz) front side bus (FSB), DDR2 Dual Channel memory interface, a PCI Express-based (PCIe-based) Direct Media Interface (DMI) link to ICH 210, and an x16 PCIe bus. The 915GM Express Chipset may also perform several power-management operations, including C2 Pop-up and Rapid Memory Power Management (RMPM), and an Intel Display Power Savings Technology 2.0 (DPST2). The embodiments are not limited in this context.

In various embodiments, media processing node 200 may include a video card 208 to connect to graphics device 206. Video card 208 may be arranged to receive the processed media information from graphics device 206, and reproduce the processed media information using display 110. For example, video card 208 may have a graphics processor and memory to perform buffer management operations between graphics device 206 and display 110, as well as other display operations. The embodiments are not limited in this context.

In various embodiments, media processing node 200 may include an input/output (I/O) controller hub (ICH) 210 to connect to graphics device 206. In one embodiment, for example, ICH 210 may comprise a Sixth Generation (ICH6-M) made by Intel Corporation. ICH 210 may be connected to various I/O devices, to include a transceiver 212, I/O ports 214, mass storage device (MSD) 216, and an audio subsystem 218, as well as other I/O devices. Examples of transceiver 212 may include a wireless local area network (WLAN) radio transceiver arranged to operate in accordance with one or more WLAN wireless protocols, such as protocol from the IEEE 802.11 series of standards. Examples of I/O ports 214 may include Universal Serial Bus (USB) ports. Examples of MSD 216 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. Examples of audio sub-system 218 may include an audio coder/decoder ("codec"), a modem codec, an audio/modem codec, an audio bus, and so forth. The embodiments are not limited in this context.

In general operation, media processing node 200 may receive media information from one or more media source nodes 102-1-n. In one embodiment, for example, media source node 102-1 may comprise a DVD device connected to ICH 210. Alternatively, media source 102-2 may comprise memory 204 storing a digital AV file, such as a motion pictures expert group (MPEG) encoded AV file. Graphics device 206 may operate to receive the media information from mass storage device 216 and/or memory 204, process the media information (sometimes using processor 202), and display the media information on display 110 via video card 208.

In order to display an image on display 110, each image is transmitted as a sequence of frames or fields (for interlaced), each of which includes a number of horizontal scan lines. Typically, time reference signals are provided in order to divide the video signal into horizontal scan lines and frames. These reference signals include a VSYNC signal that indicates the beginning of a frame or field (for interlaced) and an HSYNC signal that indicates the beginning of a next source scan line. In this way, the image is divided into a number of points where each point is displayed as a pixel. A pixel clock may be used to specify the rate at which pixels are generated, typically expressed in terms of pixels per second. Therefore, in order to display video data from a video source such as a processor, DVD device, and so forth, the video data is processed by graphics device 206 that converts the incoming video data at a native format (e.g., DTV format, HDTV format, progressive format, 720p, VGA, XGA, SXGA, UXGA, and so forth) to video data at a video display format (e.g., VGA, XGA, SXGA, UXGA, and so forth) at a clock rate determined by memory 204 into which the video data is temporarily stored. In one embodiment, for example, the incoming video data may have a visual resolution format of 720p, while display 110 may have a display resolution of 1024×768 (XGA). In this case, graphics device 206 may convert the incoming video signal from 720p to XGA for display by display 110. The embodiments, however, are not limited to this example.

In various embodiments, graphics device 206 may operate in a progressive mode to display the media information on display 110 using progressive scan techniques. For example, graphics device 206 may operate at a frame rate of 60 frames per second or 60 Hertz, and may refresh display 110 with an entire frame once every second.

In various embodiments, graphics device 206 may also operate in an interlaced mode. The interlaced mode may be used to display progressive content at the same resolution as used in progressive mode, but with interlaced timings. Since interlaced mode consumes less power than progressive mode, the interlaced mode may be suitable for the lower power operating modes of media processing node 200.

As previously described, switching between a progressive mode and an interlaced mode may be desirable to conserve power in a mobile device. Switching between scan modes, however, may cause disruptions or introduce artifacts to display 110 which are perceptible to the human visual system. When normally entering an interlaced mode, a pixel clock frequency and values for a set of display timing registers must be changed. For example, the pixel clock may operate at 65 MHz during progressive mode and 32.5 MHz during interlaced mode. Therefore, the pixel clock may need to be adjusted to half its operating frequency when switching from progressive mode to interlaced mode. Furthermore, the horizontal timing registers and/or vertical timing registers may be updated to reflect the change in the horizontal and vertical scanning rates. For example, the vertical timing register value is typically half the value used for progressive mode. When exiting interlaced mode to go back to progressive mode, the pixel clock and display timing registers must be changed again. In both instances, the display output must be disabled while making the changes in order to avoid unpredictable behavior in the display logic and in display 110 receiving the unpredictable output.

In various embodiments, graphics device 206 may seamlessly switch between progressive mode and interlaced mode with reduced disruptions to display 110. Graphics device 206 may maintain the pixel clock and display timing registers at the same values whether operating in progressive mode or interlaced mode. When graphics device 206 is switched between progressive mode and interlaced mode, graphics device 206 may interpret the pixel clock signals and display timing register values differently depending upon the given mode rather than changing the actual frequency of the pixel clock and display timing register values. In this manner the display output behavior may be more predictable thereby reducing the need to disable the display output when switching between the various scanning modes.

In one embodiment, for example, graphics device 206 may maintain the pixel clock at the same frequency for both the progressive mode and the interlaced mode. Furthermore, graphics device 206 may maintain the same values in the vertical and/or horizontal display timing registers for both the progressive mode and the interlaced mode. In one embodiment, for example, the pixel clock frequency and display timing register values may be set to the appropriate parameters suitable for the progressive mode.

In various embodiments, graphics device 206 may interpret values for the display timing registers differently depending upon whether graphics device 206 is operating in a progressive mode or interlaced mode. For example, graphics device 206 may interpret a value for one or more horizontal timing registers to represent one pixel clock in the progressive mode, and two pixel clocks in the interlaced mode. For example, when switching from progressive mode to interlaced mode, graphics device 206 may interpret the horizontal timing registers as referring to units of 2 pixel clocks when in interlaced mode instead of 1 pixel clock as in progressive mode. This effectively causes the horizontal frequency to be halved for the interlaced mode. Furthermore, graphics device 206 may interpret one or more vertical timing registers as having half their programmed value to create each field in interlaced mode.

In various embodiments, graphics device 206 may also use pixel doubling for the active region of display 110 when in interlaced mode. Pixel doubling may refer to a technique for holding each pixel output for two pixel clocks instead of outputting a new pixel at each clock cycle. For example, graphics device 206 may be arranged to output a single pixel per one pixel clock in the progressive mode, and to output a single pixel per two pixel clocks in the interlaced mode.

In various embodiments, graphics device 206 may use the interpretation and pixel doubling operations to facilitate a relatively seamless transition between interlaced mode and progressive mode at the same resolution. The interlaced mode will have half the horizontal frequency and half the frame rate of the progressive mode. A single control signal can be used to cause graphics device 206 to switch between the two modes.

In addition to having a single pixel clock frequency and a single set of values for the display timing registers, graphics device 206 may time the transitions between progressive mode and interlaced mode to further reduce potential disruptions to display 110. This may be described in more detail with reference to FIGS. 3 and 4.

Figure 3:
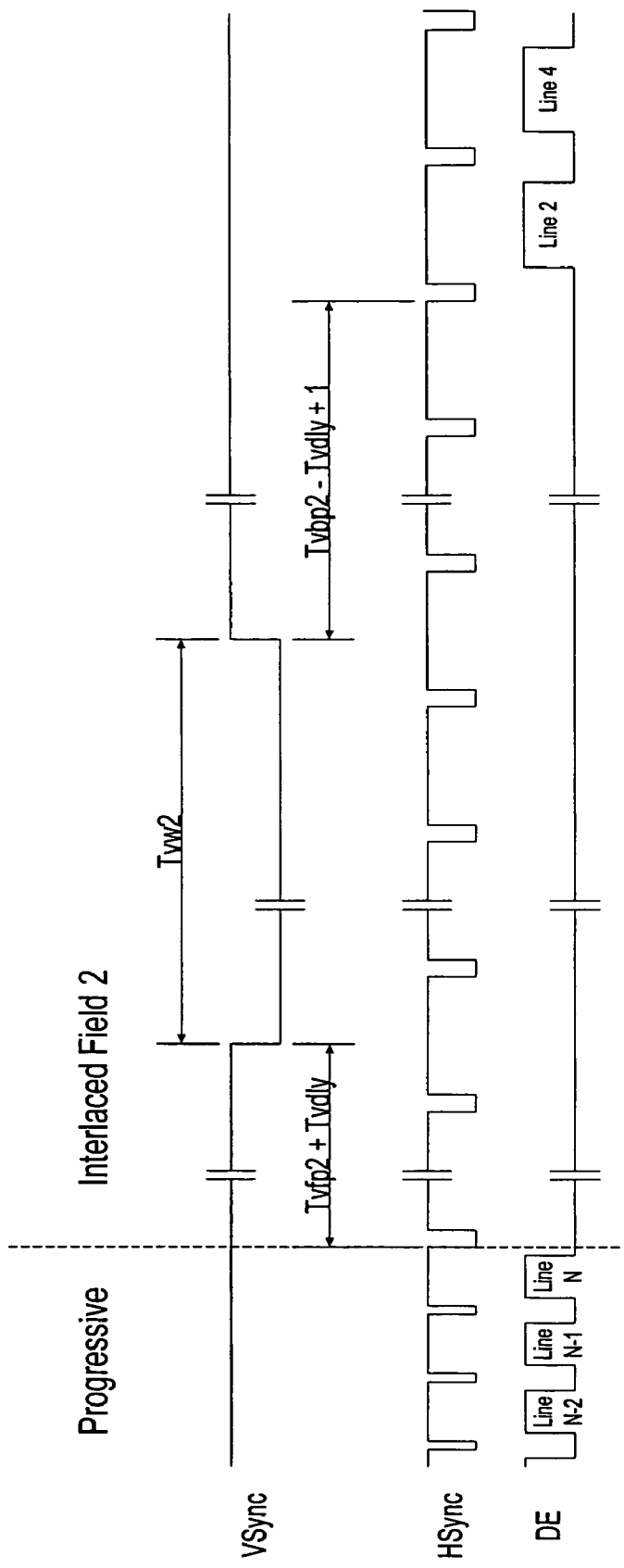
FIG. 3 illustrates one embodiment of a timing diagram.

FIG. 3 illustrates one embodiment of a timing diagram. FIG. 3 illustrates a first timing diagram for switching from a progressive mode to an interlaced mode. The first timing diagram illustrates a VSYNC signal, a HSYNC signal, and a DE signal. For the first timing diagram of FIG. 3, assume the interlaced vertical timing has the following parameters as set forth in TABLE 1:

TABLE 1

| Parameter | Symbol | Value | Units |
|---|---|---|---|
| Total Lines per frame | — | 807 | lines |
| Active Lines per frame | — | 768 | lines |
| Total Lines per field | — | 403.5 | lines |
| Active Lines per field | — | 384 | lines |
| Vertical Sync Width | Tvw2 | 3 | lines |
| Field 1 Vertical Front Porch | Tvfp2 | 2 | lines |
| Field 1 Vertical Back Porch | Tvbp2 | 14 | lines |
| Field 2 Vertical Sync delay[1] | Tvdly | 0.5 | lines |
| Field 2 Vertical Front Porch[1] | Tvfp2 + Tvdly | 2.5 | lines |
| Field 2 Vertical Back Porch[1] | Tvfp2 − Tvdly + 1 | 14.5 | lines |

Further, assume the interlaced horizontal timing has the following parameters as set forth in TABLE 2:

TABLE 2

| Parameter | Symbol | Value | Units |
|---|---|---|---|
| Total Pixel Clocks per line | Th2 | 2688 | Tclk |
| Active Pixel Clocks per line | — | 2048 | Tclk |
| Horizontal Sync Width | Thw2 | 272 | Tclk |
| Horizontal Front Porch | Thfp2 | 48 | Tclk |
| Horizontal Back Porch | Thbp2 | 320 | Tclk |
| Pixel Clock Period | Tclk | 15.38 | ns |

It is worthy to note that for the Active Pixel Clocks per line parameter, that each pixel value is active for two clock periods. For example, 1024 pixels may be delivered in the horizontal Active Region of display 110, which is 2048 pixel clocks long.

In various embodiments, graphics device 206 may order the transition between modes such that the transitions occur at the start of a vertical blank. Further, the VSYNC positioning can be used to indicate to the display logic and/or display 110 as to whether the output is progressive or interlaced.

In various embodiments, graphics device 206 may switch from the progressive mode to the interlaced mode at a vertical blank represented by the VSYNC signal, wherein the VSYNC signal is offset from the HSYNC signal. For example, when switching from progressive to interlaced, the switch does not occur until the next frame start at the start of a vertical blank. At the next frame start, graphics device 206 interlaces the video output beginning with Field 2 (e.g., the bottom field). As shown in FIG. 3, the VSYNC signal is offset from the HSYNC signal, thereby indicating to display 110 that the progressive content is now interlaced and the current field is Field 2. Graphics device 206 creates field content from the frame source. Graphics device 206 internally doubles the buffer pitch, and halves the vertical size registers including VTOTAL and VSYNC. Graphics device 206 sends the second line of the progressive display data (e.g., the first line of Field 2), then the fourth line of the progressive display data, and continuing until the end of the frame. Then graphics device 206 processes Field 1 (e.g., the top field), which has the VSYNC aligned with the HSYNC. The first display line of Field 1 is the first line of the progressive display data. Each field is displayed at the rate of the programmed frequency. In interlaced mode, a set of two fields (e.g., Field 1 and Field 2) displays in the same amount of time as two progressive frames would be displayed.

Figure 4:
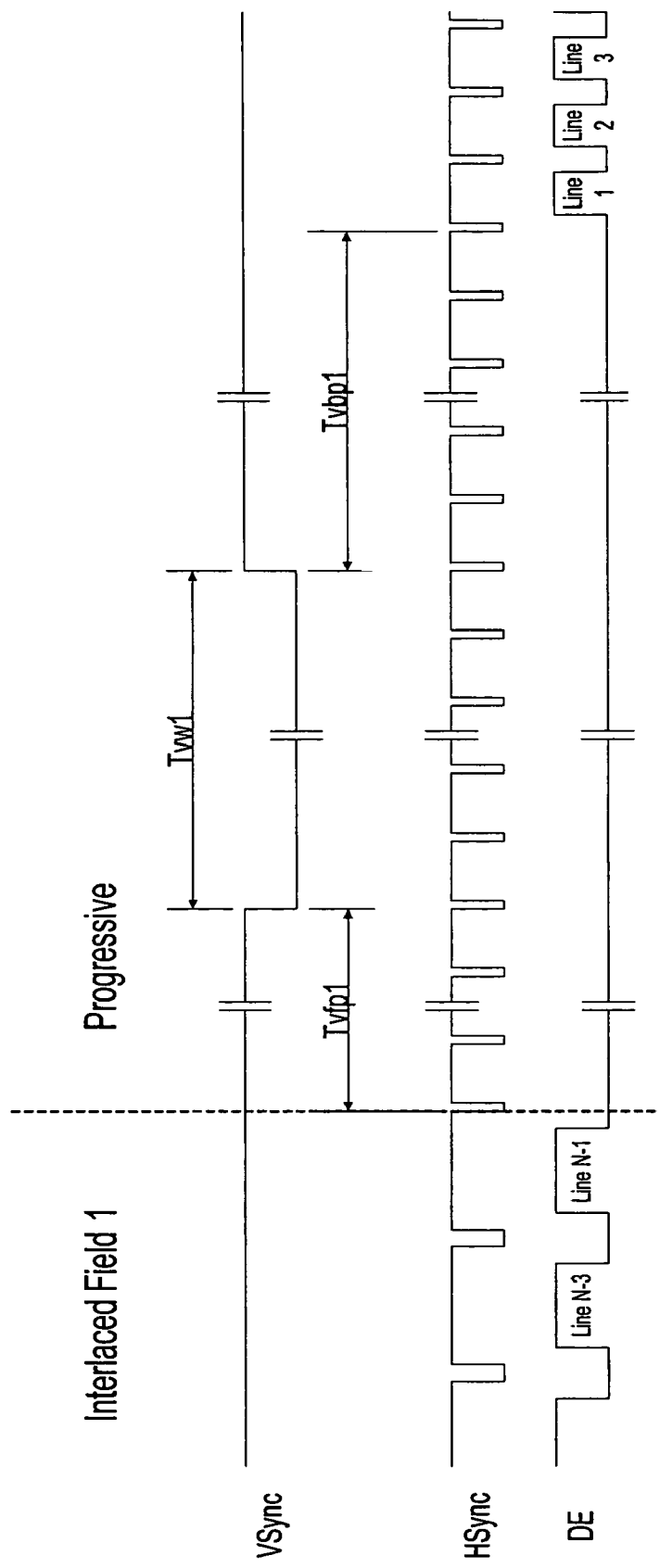
FIG. 4 illustrates one embodiment of a timing diagram.

FIG. 4 illustrates one embodiment of a timing diagram. FIG. 4 illustrates a second timing diagram for switching from an interlaced mode to a progressive mode. As with the first timing diagram, the second timing diagram illustrates a VSYNC signal, a HSYNC signal, and a DE signal. For the second timing diagram of FIG. 4, assume the progressive vertical timing has the following parameters as set forth in TABLE 3:

TABLE 3

| Parameter | Symbol | Value | Units |
|---|---|---|---|
| Total Lines per frame | — | 806 | lines |
| Active Lines per frame | — | 768 | lines |
| Vertical Sync Width | Tvw1 | 6 | lines |
| Vertical Front Porch | Tvfb1 | 4 | lines |
| Vertical Back Porch | Tvbp1 | 29 | lines |

Further, assume the progressive horizontal timing has the following parameters as set forth in TABLE 4:

TABLE 4

| Parameter | Symbol | Value | Units |
|---|---|---|---|
| Total Pixels per line | Th1 | 1344 | Tclk |
| Active Pixels per line | — | 1024 | Tclk |
| Horizontal Sync Width | Thw1 | 136 | Tclk |
| Horizontal Front Porch | Thfp1 | 24 | Tclk |
| Horizontal Back Porch | Thbp1 | 160 | Tclk |
| Pixel Clock Period | Tclk | 15.38 | ns |

In various embodiments, graphics device 206 may switch from the interlaced mode to the progressive mode at a vertical blank represented by the vertical synchronization signal VSYNC, wherein the VSYNC signal is synchronized with the HSYNC signal. For example, when switching from the interlaced mode back to progressive, graphics device 206 waits until Field 1 (e.g., the top field) of the current frame has been displayed, and then changes back to progressive mode at the start of a vertical blank. Display 110 detects the change to progressive mode when it detects that the VSYNC occurs at the same time as the HSYNC for two consecutive fields, with the first being the last interlaced Field 1, and the second being the first new progressive frame. Display 110 then changes back to displaying in progressive mode.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
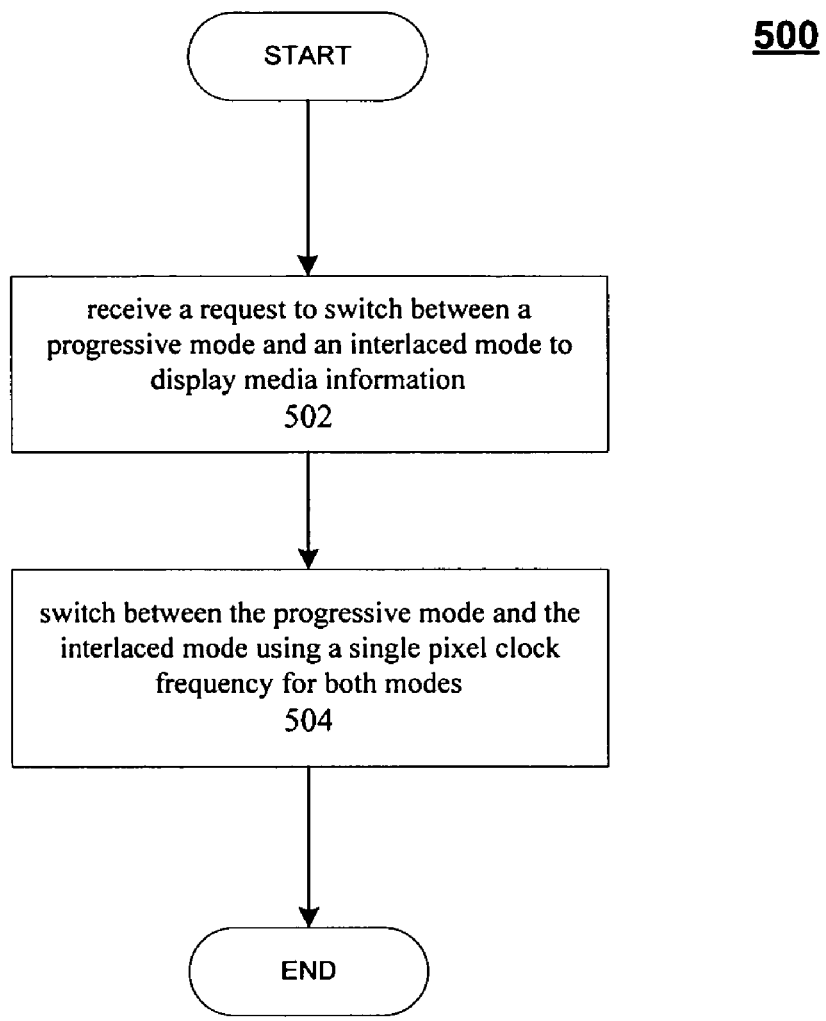
FIG. 5 illustrates one embodiment of a logic diagram.

FIG. 5 illustrates one embodiment of a logic flow. FIG. 5 illustrates a logic flow 500. Logic flow 500 may be representative of the operations executed by one or more embodiments described herein, such as system 100, node 200, and/or subsystem 108. As shown in logic flow 500, a request to switch between a progressive mode and an interlaced mode to display media information may be received at block 502. The switch between the progressive mode and the interlaced mode may be accomplished using a single pixel clock frequency for both modes at block 504. The embodiments are not limited in this context.

In one embodiment, a value for a horizontal timing register may be interpreted to represent one pixel clock in the progressive mode, and two pixel clocks in the interlaced mode. The embodiments are not limited in this context.

In one embodiment, a value for a vertical timing register may be interpreted to represent one-half of the vertical timing register value in the interlaced mode. The embodiments are not limited in this context.

In one embodiment, a single pixel per one pixel clock may be output in the progressive mode, and a single pixel per two pixel clocks may be output in the interlaced mode. The embodiments are not limited in this context.

In one embodiment, a switch from the progressive mode to the interlaced mode may be accomplished at a vertical blank represented by a vertical synchronization signal, wherein the vertical synchronization signal is offset from a horizontal synchronization signal. The embodiments are not limited in this context.

In one embodiment, a switch from the interlaced mode to the progressive mode may be accomplished at a vertical blank represented by a vertical synchronization signal, wherein the vertical synchronization signal is synchronized with a horizontal synchronization signal. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising a graphics device to switch between a progressive mode and an interlaced mode to display media information using a single pixel clock frequency for both modes, said graphics device to use one set of display timing register values for both modes and said graphics device to output a single pixel per one pixel clock in said progressive mode, and to output a single pixel per two pixel clocks in said interlaced mode, said graphics device to interpret a horizontal timing register value to represent one pixel clock in said progressive mode and two pixel clocks in said interlaced mode, and a vertical timing register value to represent one-half of said value in said interlaced mode.

2. The apparatus of claim 1, said graphics device to switch from said progressive mode to said interlaced mode at a vertical blank represented by a vertical synchronization signal, wherein said vertical synchronization signal is offset from a horizontal synchronization signal to indicate a transition from said progressive mode to a field two of said interlaced mode.

3. The apparatus of claim 1, said graphics device to switch from said interlaced mode to said progressive mode at a vertical blank represented by a vertical synchronization signal, wherein said vertical synchronization signal is synchronized with a horizontal synchronization signal to indicate a transition from a field one of said interlaced mode to said progressive mode.

4. A system, comprising:
a display; and
a media processing sub-system to couple to said display, said media processing sub-system to comprise a graphics device to switch between a progressive mode and an interlaced mode to display media information on said display using a single pixel clock frequency for both modes, said graphics device to use one set of display timing register values for both modes and said graphics device to output a single pixel per one pixel clock in said progressive mode, and to output a single pixel per two pixel clocks in said interlaced mode, said graphics device to interpret a horizontal timing register value to represent one pixel clock in said progressive mode and two pixel clocks in said interlaced mode, and a vertical timing register value to represent one-half of said value in said interlaced mode.

5. A method, comprising:
receiving a request to switch between a progressive mode and an interlaced mode to display media information;
switching between said progressive mode and said interlaced mode using a single pixel clock frequency for both modes and one set of display timing register values for both modes;
outputting a single pixel per one pixel clock in said progressive mode, and to output a single pixel per two pixel clocks in said interlaced mode; and
interpreting a value for a horizontal timing register to represent one pixel clock in said progressive mode, and two pixel clocks in said interlaced mode.

6. The method of claim 5, comprising interpreting a value for a vertical timing register to represent one-half of said value in said interlaced mode.

7. The method of claim 5, switching from said progressive mode to said interlaced mode at a vertical blank represented by a vertical synchronization signal, wherein said vertical synchronization signal is offset from a horizontal synchronization signal.

8. The method of claim 5, switching from said interlaced mode to said progressive mode at a vertical blank represented by a vertical synchronization signal, wherein said vertical synchronization signal is synchronized with a horizontal synchronization signal.

9. An article comprising a non-transitory computer-readable storage medium containing instructions that if executed by a processor enable a system to receive a request to switch between a progressive mode and an interlaced mode to display media information, switch between said progressive mode and said interlaced mode using a single pixel clock frequency for both modes and one set of display timing register values for both modes, output a single pixel per one pixel clock in said progressive mode, and to output a single pixel per two pixel clocks in said interlaced mode, and interpret a value for a horizontal timing register to represent one pixel clock in said progressive mode, and two pixel clocks in said interlaced mode.

10. The article of claim 9, further comprising instructions that if executed enable the system to interpret a value for a vertical timing register to represent one-half of said value in said interlaced mode.

11. The article of claim 9, further comprising instructions that if executed enable the system to switch from said progressive mode to said interlaced mode at a vertical blank represented by a vertical synchronization signal, wherein said vertical synchronization signal is offset from a horizontal synchronization signal.

12. The article of claim 9, further comprising instructions that if executed enable the system to switch from said interlaced mode to said progressive mode at a vertical blank represented by a vertical synchronization signal, wherein said vertical synchronization signal is synchronized with a horizontal synchronization signal.

* * * * *